United States Patent [19]
Lhost et al.

[11] Patent Number: 6,013,595
[45] Date of Patent: Jan. 11, 2000

[54] CATALYTIC SOLID FOR THE (CO) POLYMERIZATION OF ETHYLENE, PROCESS FOR ITS PREPARATION, AND CATALYTIC SYSTEM FOR THE (CO) POLYMERIZATION OF ETHYLENE

[75] Inventors: Olivier Lhost, Mons; Nicola Zandona, Waterloo, both of Belgium

[73] Assignee: Solvay (Société Anonyme), Brussells, Belgium

[21] Appl. No.: 08/607,661

[22] Filed: Feb. 27, 1996

[30] Foreign Application Priority Data

Mar. 13, 1995 [BE] Belgium ............................... 09500216

[51] Int. Cl.$^7$ ...................................................... C08F 4/24
[52] U.S. Cl. ........................... 502/113; 502/154; 526/114; 526/97; 526/129
[58] Field of Search ...................... 502/113, 154

[56] References Cited

U.S. PATENT DOCUMENTS

| | | | |
|---|---|---|---|
| 4,530,914 | 7/1985 | Eiven et al. | 502/113 |
| 5,369,196 | 11/1994 | Matsumoto et al. | 526/127 |
| 5,594,078 | 1/1997 | Welch et al. | 526/114 |
| 5,602,217 | 2/1997 | Jejelowo | 526/129 |
| 5,616,663 | 4/1997 | Imuta et al. | 502/103 |

FOREIGN PATENT DOCUMENTS

| | | |
|---|---|---|
| A-0 090 374 | 10/1983 | European Pat. Off. . |
| A-0 339 571 | 4/1989 | European Pat. Off. . |
| 339571 | 11/1989 | European Pat. Off. . |
| WO 92/15619 | 9/1992 | WIPO . |

OTHER PUBLICATIONS

Corradini, Paolo et al;"Hydrooligomerization of propene: a 'fingerprint' of a Ziegler–Natta catalyst, 2$^{a)}$", Makromol. Chem., Rapid Commun., vol. 13, No. 1, Jan. 1992, pp. 21–24, XP 000260845.

Primary Examiner—David W. Wu
Attorney, Agent, or Firm—Venable; George H. Spencer; Ashley J. Wells

[57] ABSTRACT

A catalytic solid for (co)polymerization of ethylene, includes (a) at least one inorganic support; (b) at least one transition metal metallocene having a formula $(C_p)_a(C_p')_b MX_xZ_z$, in which $C_p$ and $C_p$ each denote a cyclopentadienyl, indenyl, or fluorenyl radical or a substituted derivative of such a radical, coordinated to the central atom M, optionally the groups $C_p$ and $C_p$ are linked via a covalent bridge, M denotes the at lease one transition metal, which is selected from the group consisting of scandium, titanium, zirconium, hafnium and vanadium, a, b, x and z denote integers such that $(a+b+x+z)=m$, $x>0$, $z\geq 0$ and a and/or $b\neq 0$, m denotes the valency of the at least one transition metal M, X denotes a halogen, and Z denotes a hydrocarbon radical which may optionally comprise oxygen or a silyl radical of formula ($—R_1—Si—R'R''R'''$) where R denotes an alkyl, alkenyl, aryl, alkoxy or cycloalkyl group comprising up to 20 carbon atoms, R', R", R'" are identical or different and each denote a halogen or an alkyl, alkenyl, aryl, alkoxy or cycloalkyl group comprising up to 20 carbon atoms, and t denotes 0 or 1; (c) at least one ionizing agent selected from the group consisting of triphenylcarbenium tetrakis(pentafluorophenyl)borate, N,N-dimethylanilinium tetrakis (pentafluorophenyl)borate, tri(n-butyl)ammonium tetrakis(pentafluorophenyl)borate, lithium tetrakis (pentafluorophenyl)borate, tris(pentafluorophenyl)boron, triphenylboron, trimethylboron, tris(trimethylsilyl)borate and organoboroxines, and (d) at least one chromium compound which is selected from the group consisting of chromium oxides, chromium acetate, chromium chloride, chromium sulfate, chromates, dichromates and chromium acetylacetonate, and which is present in a molar ratio of chromium/transition metal M ranging from 0.001 to 100.

6 Claims, No Drawings

CATALYTIC SOLID FOR THE (CO) POLYMERIZATION OF ETHYLENE, PROCESS FOR ITS PREPARATION, AND CATALYTIC SYSTEM FOR THE (CO) POLYMERIZATION OF ETHYLENE

BACKGROUND OF THE INVENTION

1. Field of the Invention

The present invention relates to a mixed catalytic solid for the (co)polymerization of ethylene, containing both a metallocene and a catalyst of a metal from group VIB of the Periodic Table, in particular chromium. The invention also relates to a process for the preparation of this catalytic solid, to a catalytic system for the (co)polymerization of ethylene comprising this catalytic solid and to a process for the (co)polymerization of ethylene using the catalytic system.

2. Description of the Related Art

Various types of catalysts are known for the polymerization of ethylene, such as, for example, chromium-based catalysts, titanium-based catalysts or metallocenes, the characteristics of the polyethylene obtained being determined in particular by the nature of the catalyst used.

In order to obtain a copolymer of alpha-olefins of wide molecular mass distribution, it has already been proposed in patent application PCT-A-92/15619 to use a two-step process in which at least two alpha-olefins are polymerized in the first step using a metallocene and an aluminoxane, and the polymerization is continued in the second step in the presence of the polymer obtained from the first step. This known process requires a complex plant containing two polymerization reactors connected together.

Moreover, in patent application EP-A-339,571 it is proposed to use a catalyst comprising:

(a) a chromium compound deposited on a porous inorganic oxide support,
(b) a transition metal compound (such as bis(cyclopentadienyl)dichlorozirconium, for example), and
(c) an aluminoxane, for the manufacture of polyethylene of wide molecular mass distribution. The use of this known catalyst for the polymerization of ethylene has the drawback of leading, under certain conditions, to polyethylenes which have too low a melt index to be able to be used in processes such as injection, blow moulding, etc.

The present invention is directed towards overcoming the abovementioned drawbacks by providing a novel catalytic solid which makes it possible to obtain polyethylenes of wide molecular mass distribution and of relatively high melt index, which are suitable for simple subsequent use in processes such as injection, etc.

SUMMARY OF THE INVENTION

To this end, the invention relates to a catalytic solid for the (co)polymerization of ethylene, comprising at least one inorganic support, at least one transition metal metallocene, at least one ionizing agent and at least one compound of a metal from group VIB of the Periodic Table.

An important characteristic of the invention lies in the combination of two catalysts of different nature which are known per se in a single catalytic solid, namely a transition metal-based metallocene (which is ionized under the effect of an ionizing agent) and a catalyst based on a metal from group VIB of the Periodic Table. The Applicant has observed that these two catalysts are compatible in such a way that they may be activated simultaneously in each other's presence for the (co)polymerization of ethylene.

One of the essential characteristics of the invention lies in the use of an ionizing agent whose function is to ionize the metallocene and thereby render it active with regard to the (co)polymerization of ethylene. The Applicant has observed that the use of an ionized metallocene (formed under the effect of the ionizing agent) in combination with a chromium catalyst generally makes it possible to obtain polyethylenes of higher melt index (and thus which are easier to use) when compared with the known catalysts of this type in which the metallocene is not ionized, when they are used under the same polymerization conditions.

According to the invention, the expression ionizing agent is understood to refer to a compound comprising a first part which has the properties of a Lewis acid and which is capable of ionizing the metallocene to form a cationic metallocene, and a second part which is inert towards the ionized metallocene and which is capable of stabilizing the ionized metallocene.

The ionizing agent may be an ionic compound comprising a cation having the properties of a Lewis acid, and an anion constituting the abovementioned second part of the ionizing agent. Anions which have led to very good results are organoboron anions. The expression organoboron anion is understood to denote an anion derived from boron, in which the boron atom is linked to 4 organic substituents. Examples of cationic Lewis acids are carbenium, sulphonium, oxonium, anilinium, ammonium and the lithium cation. Carbenium is preferred. Examples of ionic ionizing agents which may be mentioned are triphenylcarbenium tetrakis(pentafluorophenyl)borate, N,N-dimethylanilinium tetrakis(pentafluorophenyl)borate, tri(n-butyl)ammonium tetrakis(pentafluorophenyl)borate and lithium tetrakis(pentafluorophenyl)borate.

As a variant, the ionizing agent may also be a nonionic compound capable of converting the metallocene into an ionized metallocene. To this end, the ionizing agent is itself converted into an anion which is inert towards the cationic metallocene and which is capable of stabilizing the latter. Examples of nonionic ionizing agents which may be mentioned are tris(pentafluorophenyl)boron, triphenylboron, trimethylboron, tris(trimethylsilyl) borate and organoboroxines.

The ionizing agent is preferably selected from triphenylcarbenium tetrakis(pentafluorophenyl)borate and tris(pentafluorophenyl)boron. Triphenylcarbenium tetrakis(pentafluorophenyl)borate is particularly suitable.

In the catalytic solid according to the invention, the metallocene is usually chosen from the compounds of formula $(C_p)_a(C_p')_b MX_x Z_z$, in which $C_p$ and $C_p'$ each denote an unsaturated hydrocarbon radical coordinated to the central atom M, it being possible for the groups $C_p$ and $C_p'$ to be linked via a covalent bridge, m denotes the transition metal, which is chosen from groups IIIB, IVB, VB and VIB of the Periodic Table, a, b, x and z denote integers such that $(a+b+x+z)=m$, $x>0$, $z \geq 0$ and a and/or $b \neq 0$, M denotes the valency of the transition metal M, X denotes a halogen, and Z denotes a hydrocarbon radical which may optionally comprise oxygen or a silyl radical of formula ($-R_t-$Si$-$R'R''R'''$) where R denotes an optionally substituted alkyl, alkenyl, aryl, alkoxy or cycloalkyl group comprising up to 20 carbon atoms, R', R" and R'" are identical or different and each denote a halogen or an optionally substituted alkyl, alkenyl, aryl, alkoxy or cycloalkyl group comprising up to 20 carbon atoms, t denotes 0 or 1.

The transition metal is preferably selected from scandium, titanium, zirconium, hafnium and vanadium. Zirconium is particularly suitable.

The groups $C_p$ and $C_p'$ each advantageously represent an optionally substituted mono- or polycyclic group comprising from 5 to 50 carbon atoms linked by conjugated double bonds. Typical examples which may be mentioned are the cyclopentadienyl, indenyl and fluorenyl radicals or a substituted derivative of such a radical. The substituted groups may be chosen from hydrocarbon radicals comprising up to 10 carbon atoms. One of the groups $C_p$ and $C_p'$ or both the groups may also represent a radical derived from an element chosen from group VA of the Periodic Table, for example nitrogen or phosphorus.

Examples of metallocenes of formula $(C_p)_a(C_p')_b MX_x Z_z$, in the case where Z is equal to 0, which may be mentioned are mono- and dihalogenated scandium metallocenes such as chlorobis(cyclopentadienyl)scandium and dichloro(indenyl) scandium, mono-, di- and trihalogenated titanium metallocenes such as chlorotris(pentamethylcyclopentadienyl) titanium, dibromobis(methylcyclopentadienyl)titanium and trichloro(cyclopentadienyl)titanium, mono-, di- and trihalogenated zirconium metallocenes such as dichlorobis (cyclopentadienyl)zirconium, iodotris(cyclopentadienyl) zirconium, dibromo(cyclopentadienyl-1-indenyl)zirconium and trichloro(fluorenyl)zirconium, mono-, di- and trihalogenated hafnium metallocenes and mono-, di- and trihalogenated vanadium metallocenes such as chlorotris (cyclopentadienyl)vanadium, dichlorobis (ethylcyclopentadienyl)vanadium and trichloro (ethylindenyl)vanadium.

In the case where z is other than 0 and where Z is a hydrocarbon radical, the metallocene of formula $(C_p)_a(C_p')_b MX_x Z_z$ may be chosen, for example, from chloro (cyclopentadienyl)ethylscandium, dibromo (methylcyclopentadienyl)butyltitanium, chloro(indenyl) isopropyltitanium and dichloro(fluorenyl)hexylzirconium.

In the case where z is other than 0 and where Z is a silyl radical of formula ($-R_t-Si-R'R"R'"$), the metallocene of formula $(C_p)_a(C_p')_b MX_x Z_z$ may be chosen, for example, from those comprising, as silyl radical, allyldimethylchlorosilyl, allylmethyldiethoxysilyl, 5-(dicycloheptenyl)trichlorosilyl, 2-bromo-3-trimethylsilyl-1-propenyl, 3-chloropropyldimethylvinylsilyl, 2-(3-cyclohexenyl)ethyltrimethoxysilyl and diphenylvinylchlorosilyl.

Metallocenes having a covalent bridge connecting the two groups $C_p$ and $C_p'$ may contain, as bridging group, an alkylene group which may optionally comprise oxygen, an alkenylene, arylalkylene, alkylarylene or arylalkenylene group, which is optionally halogenated, or a radical derived from an element chosen from groups IIIA, IVA, VA and VIA of the Periodic Table, such as boron, aluminium, silicon, germanium, tin, nitrogen, phosphorus and sulphur. Ethylene, dimethylsilylene and dimethylmethylene are particularly suitable.

The preferred metallocenes of formula $(C_p)_a(C_p')_b MX_x Z_z$ are those in which the groups $C_p$ and $C_p'$ are chosen from cyclopentadienyl, indenyl and fluorenyl radicals. Good results are obtained with those in which the groups $C_p$ and $C_p'$ are linked by a covalent bridge of the alkylene type. Metallocenes whose transition metal is chosen from titanium, zirconium and hafnium are very suitable. Particularly satisfactory results are obtained with metallocenes derived from zirconium.

In the catalytic solid according to the invention, the metal from group VIB of the Periodic Table is preferably chromium. The chromium compound may be chosen from inorganic or organic chromium compounds in which the chromium is in the hexavalent, trivalent or divalent state. Examples of chromium compounds which may be mentioned are chromium oxides and chromium salts such as chromium acetate, chromium chloride, chromium sulphate, chromates and dichromates or chromium acetylacetonate. Such compounds may be, for example, hexavalent chromium compounds obtained by oxidation of a chromium compound in which the chromium is in a reduced state, it being optionally possible for the oxidation to be performed in the presence of an inorganic support. Such compounds may also be tri- or divalent chromium compounds obtained by reduction of hexavalent chromium compounds, optionally in the presence of an inorganic support.

In the catalytic solid according to the invention, the amounts of metallocene and of group VIB metal compound present depend on the desired characteristics of the ethylene (co)polymer. When it is desired to obtain an ethylene (co)polymer having properties similar to those which are intrinsic to catalysts based on a group VIB metal, it is desirable for the group VIB metal/transition metal molar ratio to be high. On the other hand, if it is desired to obtain properties similar to those imparted by metallocenes, it is preferable for this ratio to be low. The metallocene and the group VIB metal compound are generally present in amounts such that the group VIB metal/transition metal molar ratio is at least 0.001, in particular at least 0.01, ratios of at least 0.1 being the most advantageous. The group VIB metal/transition metal molar ratio is usually not more than 100, more precisely not more than 50, ratios of not more than 10 being recommended, for example from about 1 to about 3.5.

The inorganic support for the catalytic solid according to the invention may be chosen, for example, from metal halides such as magnesium chloride, from metal oxides such as silicon, aluminium, titanium, zirconium or thorium oxides, mixtures thereof and mixed oxides of these metals such as aluminium silicate and aluminium phosphate. The support may optionally be treated with a fluoro compound. Silica, alumina, magnesium chloride, aluminium phosphate and mixtures of silica, alumina and aluminium phosphate are suitable for use. Supports simultaneously containing silica (X), alumina (Y) and aluminium phosphate (Z) are advantageous, in particular those in which the (X):(Y):(Z) molar ratio is (10 to 95):(1 to 80):(1 to 85), more precisely (20 to 80):(1 to 60):(5 to 60).

The support generally has a particle size characterized by a mean diameter D of at least 10 μm, in particular of at least 20 μm, diameters of at least 40 μm being the most common. The diameter is usually not more than 1000 μm, typically not more than 500 μm, values of not more than 200 μm being recommended. The particle size is usually also characterized by a standard deviation σ of at least 10 μm, more precisely of at least 20 μm. The standard deviation is commonly not more than 50 μm, advantageously not more than 40 μm.

The support advantageously has a specific surface, measured by the volumetric BET method of British Standard BS 4359/1 (1984), of at least 100 m$^2$/g, more especially of at least 180 m$^2$/g, values of at least 220 m$^2$/g being the most advantageous. The specific surface is commonly not more than 800 m$^2$/g, usually not more than 700 m$^2$/g, values of not more than 650 m$^2$/g being favourable.

In most cases, the support is also characterized by a pore volume of at least 1.5 cm$^3$/g, in particular of at least 2.0 cm$^3$/g, values of at least 2.2 cm$^3$/g being the most common. The pore volume is usually not more than 5.0 cm$^3$/g, preferably not more than 4.5 cm$^3$/g, values of not more than 4.0 cm$^3$/g being recommended. The pore volume is the sum of the pore volume measured by the nitrogen penetration method (BET) according to the volumetric technique described in British Standard BS 4359/1 (1984) and the pore volume measured by the mercury penetration method using a porosimeter of the type Poro 2000 marketed by Carlo Erba Co., according to Belgian Standard NBN B 05-202 (1976).

The catalytic solid according to the invention advantageously comprises the support in amount of at least 0.01% by weight relative to the total weight of the inorganic support and of the group VIB metal compound, preferably of at least 0.1% by weight, values of at least 0.2% by weight being the most common; the amount of support usually does not exceed 2% by weight, in particular it does not exceed 1.5% by weight, values of not more than 1% by weight being recommended.

It goes without saying that the catalytic solid according to the invention may comprise more than one metallocene, more than one ionizing agent, more than one support and/or more than one group VIB metal compound.

The catalytic solid according to the invention has the advantage of making it possible to obtain ethylene (co) polymers which have a high melt index and a wide molecular mass distribution, thereby facilitating their use, without difficulties, in all the standard processes for the manufacture of shaped articles, such as extrusion, extrusion-blow moulding, extrusion-thermoforming and injection processes. The catalytic solid according to the invention also makes it possible to obtain ethylene (co)polymers which have good rheological properties.

The catalytic solid according to the invention can be obtained by any known suitable means. In particular, the catalytic solid according to the invention is manufactured by means of a process according to which, in a first step, a solid comprising an inorganic support and a group VIB metal compound is prepared and, in a second step, a compound based on a transition metal metallocene and a compound based on an ionizing agent are incorporated therein.

In the process according to the invention, the solid comprising a support and a group VIB metal compound may be obtained by any suitable known means. It may, for example, be obtained by impregnating the support with an aqueous or organic solution of a group VIB metal compound, followed by drying in an oxidizing atmosphere. A group VIB metal compound chosen from soluble salts such as the acetate, the chloride or the sulphate (in particular when the metal is chromium, chromates and dichromates) in aqueous solution, or such as acetylacetonate in organic solution, may be used for this purpose. After impregnation of the support with the group VIB metal compound, the impregnated support is advantageously activated by heating it to a temperature of 400 to 1000° C. in order to convert at least some of the metal into hexavalent metal. Next, the hexavalent metal may optionally be reduced at least partially by a reducing agent such as, for example, carbon monoxide or ethylene. The group VIB metal compound used may also be prepolymerized.

The solid comprising a support and a group VIB metal compound may advantageously be obtained by means of a mechanical mixture of a support with a solid compound of a group VIB metal in the absence of a liquid, for example the metal acetylacetonate. Next, this mixture is advantageously preactivated at a temperature below the melting point of the group VIB metal compound before activating it conventionally as described above.

As a variant, the group VIB metal compound may also be incorporated into the support during the manufacture thereof so as to obtain a homogeneous dispersion of the metal in the support.

In the solid comprising a support and a group VIB metal compound, the metal is generally present in a proportion of at least 0.05% by weight based on the total weight of the solid, in particular of at least 0.1% by weight, values of at least 0.25% by weight being the most advantageous. The proportion of metal is usually not more than 10% by weight based on the total weight of the solid, more precisely not more than 5% by weight, values of not more than 2% by weight being the most common.

In the second step of the process according to the invention, the incorporation of the metallocene-based compound and that of the compound based on an ionizing agent may be carried out simultaneously or separately. In the latter case, the metallocene-based compound and the compound based on an ionizing agent may be added in any order.

In the second step of the process according to the invention, the incorporation may be performed by any suitable known means. When the metallocene-based compound and the compound based on an ionizing agent are added simultaneously, this is preferably carried out by mixing with the solid comprising a support and a group VIB metal compound in a heterogeneous medium. For the purposes of the present invention, the expression "heterogeneous medium" is understood to denote a medium comprising the solid containing a support and a group VIB metal compound, the compound based on an ionizing agent and the metallocene-based compound, in which at least 80% (preferably at least 95%) of at least one of these last two compounds and at least 80% (preferably at least 95%) of the solid containing a support and a group VIB metal compound are in the solid state. This heterogeneous medium may be essentially solid and obtained by mixing, in the absence of a liquid, the two abovementioned compounds in the solid state with the solid comprising a support and a group VIB metal compound, generally in the form of powders. As a variant, the heterogeneous medium may contain a liquid phase and consist of a suspension comprising an organic liquid in which at least 80% (preferably at least 95%) of at least one of the two compounds (the compound based on an ionizing agent and the metallocene-based compound) and at least 80% (preferably 95%) of the solid containing a support and a group VIB metal compound are insoluble. Organic liquids which may be used are aliphatic hydrocarbons chosen from linear alkanes (for example n-butane, n-hexane and n-heptane), branched alkanes (for example isobutane, isopentane, isooctane and 2,2-dimethylpropane) and cycloalkanes (for example cyclopentane and cyclohexane). Monocyclic aromatic hydrocarbons such as benzene and derivatives thereof, for example toluene, and polycyclic aromatic hydrocarbons, in which it is possible for each ring to be substituted, are also suitable, insofar as a heterogeneous medium as defined above is used. It is also possible to use a halogenated aliphatic hydrocarbon, for instance chlorinated alkanes such as, for example, $CH_2Cl_2$ or $CCl_4$. Aromatic hydrocarbons and chlorinated alkanes are preferred. When the metallocene-based compound and the compound based on an ionizing agent are added separately, the first compound is advantageously incorporated in a heterogeneous medium in which at least 80% (preferably 95%) of the solid containing a support and a group VIB metal compound is in the solid state. The second compound is then preferably incorporated in a heterogeneous medium in which at least 80% (preferably 95%) either of the first or of the second or of both compounds and at least 80% (preferably 95%) of the solid containing a support and a group VIB metal compound are in the solid state. The heterogeneous media may be essentially solid or may contain a liquid phase as described above.

The metallocene-based compound and/or the compound based on an ionizing agent may be incorporated, for example, in a mixer fitted with a stirrer, in a rotating-bed reactor or in a stirred- or fluidized-bed reactor or alternatively in a rotary reactor. In general, in the case where the addition is carried out in the absence of an organic liquid, it may prove to be desirable to mix the metallocene-based compound and the compound based on the ionizing agent with the solid comprising a support and a group VIB metal compound by grinding them together. The process is preferably performed in a rotary reactor or in a mixer fitted with a stirrer.

In a particularly advantageous embodiment of the process according to the invention, the second step is carried out by first mixing the solid comprising a support and a group VIB metal compound with a metallocene-based compound in the absence of a liquid and then by impregnating the mixture thus obtained with a solution of a compound based on an ionizing agent. The mixing in the absence of a liquid is preferably performed in a fluid bed. This embodiment is also suitable for manufacturing catalytic solids free of group VIB metal compound, namely catalytic solids essentially comprising at least one inorganic support, at least one transition metal metallocene and at least one ionizing agent. In this case, the manufacture is performed by first mixing the support with a metallocene-based compound in the absence of a liquid and then impregnating the mixture thus obtained with a solution of a compound based on an ionizing agent.

In the preparation process according to the invention, the metallocene and the ionizing agent are in accordance with those described above. The expression "metallocene-based compound" is understood to denote the pure metallocene or a mixed compound comprising the metallocene and at least one other solid substance which is different from the metallocene and from the ionizing agent and which is inert with respect to these. The expression "compound based on an ionizing agent" is understood to denote the pure ionizing agent or a mixed compound comprising the ionizing agent and at least one other solid substance which is different from the ionizing agent and from the metallocene and which is inert with respect to these. These solid substances may be of the polymeric type (such as olefin polymers) or inorganic type (such as metal oxides and metal halides). These respective mixed compounds may, for example, be obtained by mechanical mixing, in the solid state, of the metallocene or the ionizing agent with the solid substance. As a variant, they may be obtained by impregnating the solid substance with a solution of the metallocene or, respectively, of the ionizing agent. It is also possible to use the metallocene and the ionizing agent in pure form.

The amounts of the metallocene-based compound and of the compound based on the ionizing agent used in the preparation process according to the invention are usually such that the metallocene/ionizing agent molar ratio is at least 0.5, in particular at least 1. The metallocene/ionizing agent molar ratio generally does not exceed 2. A molar ratio of 1 is preferred.

The temperature at which the incorporation is carried out in the second step of the process according to the invention may be any temperature below the decomposition temperature of the support, of the group VIB metal compound, of the metallocene-based compound and of the compound based on an ionizing agent. The temperature consequently depends on the nature of these constituents; it is generally at least equal to 0° C., preferably to 20° C.; values at most equal to 250° C. are the most common, those below 200° C., for example 150° C., being the most advantageous. In the case where the heterogeneous medium is a suspension comprising an organic liquid, the temperature must be such that at least 80% (preferably 95%) of the solid containing a support and a group VIB metal compound and, where appropriate, at least 80% (preferably at least 90%) of at least one of the two compounds (the compound based on an ionizing agent and the metallocene-based compound) are insoluble in the organic liquid. The incorporation may be performed at a constant temperature or at a variable temperature, in a continuous or batchwise manner.

In the second step of the process according to the invention, the duration for which the incorporation is carried out must be sufficient to homogenize the mixture to the maximum. The duration will depend on the mixer used. It is generally at least equal to 1 min, preferably to 5 h; for economic considerations, it is desirable for this duration not to exceed 100 h, in particular not to exceed 50 h. A duration of about 24 h is particularly suitable.

In one specific embodiment of the process according to the invention, the metallocene-based compound and/or the compound based on an ionizing agent also comprise, as solid substance different from the metallocene and/or from the ionizing agent, a support. The support is in accordance with the support described above. The amount of support present in the metallocene-based compound or compound based on an ionizing agent is such that the weight ratio of the support to the metallocene-based compound (or to the compound based on an ionizing agent) is at least equal to 0.05, preferably to 2; it is desirable for this ratio not to exceed 1000, in particular not to exceed 100, values in the region of 10 being recommended.

The catalytic solid according to the invention finds an application for the (co)polymerization of ethylene, in combination with a cocatalyst.

The invention consequently also relates to a catalytic system for the (co)polymerization of ethylene, obtained by placing a catalytic solid in accordance with the invention, as defined above, in contact with a cocatalyst selected from organometallic compounds of a metal chosen from groups IA, IIA, IIB, IIIA and IVA of the Periodic Table.

In the catalytic system according to the invention, the cocatalyst may, for example, be chosen from organometallic compounds of lithium, magnesium, zinc, aluminium or tin. The best results are obtained with organoaluminium compounds which comprise at least one aluminium-carbon bond and which may optionally comprise oxygen and/or a halogen. Examples which may be mentioned are trialkylaluminium compounds, halogenated alkylaluminium compounds and alkylaluminium compounds comprising at least one alkoxy group. The organoaluminium compounds advantageously correspond to the general formula AlTT'T" in which the groups T, T' and T" each denote an alkyl, alkenyl, aryl or alkoxy group, optionally substituted, containing up to 20 carbon atoms. Such a group may be, for example, trimethyl-, triethyl-, tripropyl-, triisopropyl-, tributyl-, triisobutyl-, trihexyl-, trioctyl- and tridodecylaluminium. Trimethylaluminium is particularly suitable. It is also possible to use triethylboron, alone or as a mixture with an organoaluminium compound as described above.

In the catalytic system according to the invention, the amount of cocatalyst used may vary within a wide range. It is generally such that the molar ratio of the cocatalyst to the metallocene is at least equal to 5. However, in practice, there is no advantage in this ratio exceeding 5000, values of less than 2000 being recommended. Values in the region of 10 to 500 are generally suitable when the catalytic system is intended for the polymerization of olefins.

The catalytic system according to the invention may be used for the homopolymerization and the copolymerization of ethylene with one or more comonomers. The comonomers may be various materials. They may be monoolefins which may comprise up to 8 carbon atoms, for example 1-butene, 1-pentene, 3-methyl-1-butene, 1-hexene, 3- and 4-methyl-1-pentenes and 1-octene. One or more diolefins comprising from 4 to 18 carbon atoms may also be copolymerized with ethylene and propylene. The diolefins are preferably chosen from non-conjugated aliphatic diolefins such as 4-vinylcyclohexene and 1,5-hexadiene, alicyclic diolefins having an endocyclic bridge, such as dicyclopentadiene, methylene- and ethylidene-norbornene, and conjugated aliphatic diolefins such as 1,3-butadiene, isoprene and 1,3-pentadiene.

The catalytic system according to the invention appears to be of particularly high performance for the manufacture of ethylene homopolymers, and of ethylenecopolymers containing at least 90%, preferably at least 95%, by weight of ethylene. The preferred ethylene comonomers are propylene, 1-butene, 1-hexene, 1-octene and 1,5-hexadiene and mixtures thereof. The comonomers most particularly preferred are 1-butene and 1-hexene.

The present invention also relates to a process for the (co)polymerization of ethylene in which a catalytic system in accordance with the invention, as defined above, is used.

According to a particularly advantageous embodiment of the polymerization process according to the invention, the ethylene is first mixed with the cocatalyst and the catalytic solid is then added to the mixture thus obtained. In this advantageous embodiment of the polymerization process according to the invention, the cocatalyst is generally used in the form of a solution in a hydrocarbon diluent. This hydrocarbon diluent may be chosen from aliphatic hydrocarbons such as linear alkanes (for example n-butane, n-hexane and n-heptane), branched alkanes (for example isobutane, isopentane, isooctane and 2,2-dimethylpropane) and cycloalkanes (for example cyclopentane and cyclohexane). The process is preferably performed in isobutane or hexane.

In this advantageous embodiment of the polymerization process according to the invention, as soon as the catalytic solid is placed in contact with the hydrocarbon diluent, the cocatalyst and the ethylene react so as to convert the metallocene into an active catalytic substance in ionized form.

In one variant of this specific embodiment of the polymerization process according to the invention, intended to copolymerize ethylene with at least one comonomer, the ethylene and the comonomer(s) is (are) introduced simultaneously or staggered over time into the polymerization reactor before addition of the solid precursor of the catalytic system.

In the polymerization process according to the invention, the polymerization may be carried out, without preference, in solution, in suspension or in the gas phase, and may be performed in a continuous or batchwise manner, for example by carrying out a suspension polymerization in a first reactor followed by a gas-phase polymerization in a second reactor or by working in the gas phase in two consecutive reactors. As a variant, it is also possible to perform the polymerization in several reactors arranged in series, the temperature and/or pressure and/or concentration of comonomer in the first reactor being different from those prevailing in the other reactors. A molecular weight regulator such as hydrogen or diethyl zinc may optionally be used in the polymerization.

In the case of a suspension polymerization, this is carried out in a hydrocarbon diluent at a temperature such that at least 80% (preferably at least 95%) of the (co)polymer formed is insoluble therein. The hydrocarbon diluent may be chosen from aliphatic, cycloaliphatic and aromatic liquid hydrocarbons. The preferred diluents are linear alkanes such as n-butane, n-hexane and n-heptane or branched alkanes such as isobutane, isopentane, isooctane and 2,2-dimethylpropane or cycloalkanes such as cyclopentane and cyclohexane, or mixtures thereof. The temperature is generally at least equal to 20° C., preferably at least 50° C.; it is usually at most equal to 200° C., preferably at most 100° C. The partial pressure of olefin is usually at least equal to atmospheric pressure, preferably $\geq 0.4$ MPa, for example $\geq 0.6$ MPa; this pressure is generally at most equal to 5 MPa, preferably $\leq 2$ MPa, for example $\leq 1.5$ MPa.

DESCRIPTION OF THE PREFERRED EMBODIMENTS

The examples whose description follows serve to illustrate the invention. In these examples, a catalytic solid in accordance with the invention was manufactured, by means of the process according to the invention, and it was then used to polymerize ethylene.

The meaning of the symbols used in these examples, the units expressing the magnitudes mentioned and the methods for measuring these magnitudes are explained below.

$MI_2$=melt index of the molten polymer at 190° C., measured under a 2.16 kg load and expressed in g/10 min according to ASTM standard D 1238 (1990).

$MI_5$=melt index of the molten polymer at 190° C., measured under a 5 kg load and expressed in g/10 min according to the ASTM standard D 1238 (1990).

HLMI=melt index of the molten polymer at 190° C., measured under a 21.6 kg load and expressed in g/10 min according to the ASTM standard D 1238 (1990).

ST standard density of the polymer, expressed in kg/m³ and measured according to ASTM standard D 1928.

S=fraction of oligomers in the polymer, expressed in grams of oligomers per kilo of polymer and measured by extraction for 2 hours with hexane at its boiling point.

$\mu_2$=viscosity (in dPa.s) measured at a rate gradient of 100 s$^{-1}$. The die used is 30 mm in height and has an internal cross-section of 2 mm.

$\mu_0/\mu_2$=ratio between the viscosities measured at a rate gradient of 1 s$^{-1}$ and 100 s$^{-1}$. The die used is 30 mm in height and has an internal cross-section of 2 mm.

$M_n$=number-average molecular mass measured by steric exclusion chromatography performed in 1,2,4-trichlorobenzene at 135° C. on a type 150 C chromatograph from the company Waters. This mass is expressed in daltons.

$M_w$=weight-average molecular mass measured by steric exclusion chromatography performed in 1,2,4-trichlorobenzene at 135° C. on a type 150 C chromatograph from the company Waters. This mass is expressed in daltons.

$M_z$=mean molecular mass of the polymer, defined by the relationship: $M_z=(\Sigma\ w_i\ M_i^2)/(\Sigma\ w_i\ M_i)$ where $w_i$ denotes the weight of the polymer of molecular mass $M_i$. The magnitude $M_z$ is measured by steric exclusion chromatography performed in 1,2,4-trichlorobenzene at 135° C. on a type 150C chromatograph from the company Waters. This mass is expressed in daltons.

EXAMPLE 1

In Accordance with the Invention a) Preparation of a solid comprising a support and a chromium compound:

15 g of a support of composition $AlPO_4/SiO_2/Al_2O_3$ =48/51/2 (molar ratio) and containing 0.7% by weight of Cr were calcined at 815° C. under a stream of dry air. After 16 hours, the catalyst was recovered.

b) Incorporation of a metallocene (bis(cyclopentadienyl) dichlorozirconium):

9.451 g of the catalyst activated in step (a) above were mixed with 0.207 g of bis(cyclopentadienyl) dichlorozirconium at 70° C. for 16 h under nitrogen.

c) Incorporation of an ionizing agent (triphenylcarbenium tetrakis(pentafluorophenyl)borate):

4.158 g of the mixture prepared during step (b) were added to 0.281 g of triphenylcarbenium tetrakis (pentafluorophenyl)borate. The mixture was stirred at room temperature for 15 hours. The catalytic solid was then recovered.

d) Polymerization of ethylene:

Trimethylaluminium (TMA) dissolved in hexane and 1 liter of isobutane were introduced into a 3-liter pre-dried autoclave fitted with a stirrer. The autoclave was heated to a set temperature which was maintained throughout the test. When the set temperature was reached, ethylene was introduced into the autoclave at a partial pressure of 10 bar. Hydrogen was also introduced at a partial pressure given in the table below. A given amount of the catalytic solid prepared during step (c) described above was then injected into the autoclave with 100 ml of isobutane at 40 bar. During the reaction, the total pressure was maintained by addition of ethylene into the autoclave. After one hour the polymerization was stopped by degassing and cooling the autoclave.

In Table 1 below, TMA gives the number of ml of a solution of hexane containing 50 g/l of trimethylaluminium, the temperature (Temp.) is given in °C., the partial pressure of hydrogen (H2) in bar, the amount of catalyst introduced (Cat.) in mg and the amount of polyethylene collected (PE) in g.

TABLE 1

| Example | TMA | Temp. | H2 | Cat. | PE |
|---------|-----|-------|-----|------|-----|
| 1a | 0 | 60 | 0.2 | 182 | 65 |
| 1b | 0.3 | 60 | 0.2 | 236 | 122 |
| 1c | 0.75 | 60 | 0.2 | 160 | 41 |
| 1d | 1.5 | 60 | 0.2 | 234 | 47 |
| 1e | 1.5 | 60 | 0 | 323 | 78 |
| 1f | 1.5 | 60 | 0.6 | 299 | 67 |
| 1g | 1.5 | 50 | 0.2 | 198 | 28 |
| 1h | 1.5 | 70 | 0.2 | 237 | 72 |
| 1i | 1.5 | 80 | 0.2 | 244 | 56 |
| 1j | 1.5 | 90 | 0.2 | 350 | 15 |

NM = not measured

TABLE 2

| Example | MI2 | MI5 | HLMI | SD | S | $\mu_2$ | $\mu_0/\mu_2$ | $M_n$ | $M_w$ | $M_z$ |
|---------|-----|-----|------|-----|-----|---------|----------|-------|-------|-------|
| 1a | <0.1 | <0.1 | <0.1 | 953.0 | 16 | not measured | | | not measured | |
| 1b | <0.1 | <0.1 | 6.4 | 959.1 | 27 | 22800 | 22.6 | 4040 | 317000 | 2880000 |
| 1c | <0.1 | 0.14 | 13.6 | 964.1 | 31 | 17300 | 23.4 | 1790 | 286000 | 3050000 |
| 1d | <0.1 | 3.0 | 103 | 969.1 | 34 | 10200 | 22.2 | 1480 | 219000 | 3120000 |
| 1e | <0.1 | <0.1 | 0.11 | 945.9 | 14 | not measured | | 3180 | 513000 | 2740000 |
| 1f | 1.3 | 17 | >500 | 971.4 | NM | 4800 | 17.3 | 899 | 175000 | 5700000 |
| 1g | <0.1 | NM | 44 | 968.9 | NM | not measured | | 891 | 350000 | 8460000 |
| 1h | 13 | 63 | >500 | 970.4 | NM | 3400 | 7.0 | | not measured | |
| 1i | 17 | 82 | >500 | 971.7 | NM | 3700 | 11.7 | | not measured | |
| 1j | NM | NM | >500 | NM | NM | not measured | | 1570 | 125000 | 3340000 |

EXAMPLE 2

In Accordance with the Invention a) Preparation of the catalytic solid:

Operations (a) to (c) of Example 1 were repeated so as to obtain a Cr/Zr molar ratio of 3.3.

b) Polymerization of ethylene:

1.5 ml of a solution of hexane containing 50 g/l of trimethylaluminium and 1 liter of isobutane were introduced into a 3-liter pre-dried autoclave fitted with a stirrer. The autoclave was heated to 60° C. and this temperature was maintained throughout the test. When the set temperature was reached, ethylene and hydrogen were introduced into the autoclave at partial pressures of 10 bar and 0.2 bar respectively. 159 mg of the catalytic solid prepared during step (a) described above were then introduced into the autoclave with 100 ml of isobutane at 40 bar. During the reaction, the total pressure was maintained by addition of ethylene into the autoclave. After 1 hour, the polymerization was stopped by degassing and cooling the autoclave. 41 g of polyethylene were collected.

The characteristics of the polymer were:

$MI_2$<0.1 g/10 min.

MI5<0.1 g/10 min.

HLMI<0.1 g/10 min.

SD=960.9 kg/m$^3$

S=32 g/kg $M_n$ 1420
$M_w$=349000
$M_z$=2930000

EXAMPLE 3

In Accordance with the Invention a) Preparation of the catalytic solid:

Operations (a) to (c) of Example 1 were repeated so as to obtain a Cr/Zr molar ratio of 0.95.

b) Polymerization of ethylene:

1.5 ml of a solution of hexane containing 50 g/l of trimethylaluminium and 1 liter of isobutane were introduced into a 3-liter pre-dried autoclave fitted with a stirrer. The autoclave was heated to 60° C. and this temperature was maintained throughout the test. Ethylene and hydrogen were introduced into the autoclave at partial pressures of 10 bar and 0.2 bar respectively. 160 mg of the catalytic solid prepared during step (c) described above were then introduced into the autoclave with 100 ml of isobutane at 40 bar. During the reaction, the total pressure was maintained by addition of ethylene into the autoclave. After 1 hour, the polymerization was stopped by degassing and cooling the autoclave. 149 g of polyethylene were collected.

The characteristics of the polymer were:

$MI_2$=40 g/10 min.

MI5=126 g/10 min.

HLMI>500 g/10 min.

SD=971.2 kg/m³

S=20 g/kg $M_n$ 2230

$M_w$=115000

$M_z$=2380000

EXAMPLE 4

In Accordance with the Invention a) Preparation of a solid comprising a support and a chromium compound:

15 g of a support of composition $AlPO_4/SiO_2/Al_2O_3$=47.5/50.4/2.1 (molar ratio) were mixed with chromium acetylacetonate in an amount such that the mixture contains 1% by weight of Cr. The mixture thus obtained was then treated in a fluid bed at 150° C. for 2 hours under a stream of dry air. It was then calcined at 815° C., still under a stream of dry air. After 16 hours at 815° C., the catalyst was recovered.

b) Incorporation of a metallocene (bis(cyclopentadienyl) dichlorozirconium):

13.2 g of the solid obtained in step (a) above were mixed with 0.371 g of bis(cyclopentadienyl) dichlorozirconium at 70° C. for 16 h under nitrogen.

c) Incorporation of an ionizing agent (triphenylcarbenium tetrakis(pentafluorophenyl)borate):

4.4 g of the mixture prepared during step (b) were added to 0.390 g of triphenylcarbenium tetrakis (pentafluorophenyl)borate in 25 ml of $CH_2Cl_2$. The $CH_2Cl_2$ was then removed by distillation under reduced pressure at room temperature. The catalytic solid was then dried at 50° C.

d) Polymerization of ethylene:

Trimethylaluminium in solution in hexane and 1 liter of isobutane were introduced into a 3-liter pre-dried autoclave fitted with a stirrer. The autoclave was heated to a set temperature which was maintained throughout the test. When the set temperature was reached, ethylene was introduced into the autoclave at a partial pressure of 10 bar. Hydrogen was also introduced at a partial pressure given in the table below. A given amount of the catalytic solid prepared during step (c) described above was then injected into the autoclave with 100 ml of isobutane at 40 bar. During the reaction, the total pressure was maintained by adding ethylene into the autoclave.

The polymerization was stopped by degassing and cooling the autoclave.

TABLE 3

| Example | TMA | Temp. | H2 | time | Cat. | PE | $MI_2$ | HLMI |
|---|---|---|---|---|---|---|---|---|
| 4a | 1.5 | 60 | 0.2 | 90 | 187 | 181 | 0.75 | 48 |
| 4b | 1.5 | 70 | 0.2 | 90 | 162 | 207 | 0.6 | 39 |
| 4c | 1.5 | 80 | 0.2 | 120 | 146 | 116 | 12.4 | 414 |
| 4d | 1.5 | 60 | 0.4 | 90 | 194 | 231 | 0.6 | 46 |
| 4e | 1.5 | 60 | 0.6 | 120 | 161 | 211 | 2 | 143 |
| 4f | 1.5 | 60 | 0.2 | 120 | 162 | 380 | <0.1 | 2 |
| 4g | 1.5 | 60 | 0.2 | 150 | 168 | 485 | <0.1 | 2 |
| 4h | 1.5 | 60 | 0.2 | 120 | 88 | 132 | 5.2 | 240 |
| 4i | 1.5 | 60 | 0.2 | 120 | 120 | 219 | 0.1 | 10.5 |
| 4j | 1.5 | 60 | 0.2 | 120 | 170 | 442 | <0.1 | 2.5 |
| 4k | 0.5 | 60 | 0.2 | 120 | 125 | 285 | 0.1 | 8.6 |
| 4l | 0.2 | 60 | 0.2 | 120 | 117 | 227 | 0.25 | 19.1 |
| 4m | 0.5 | 70 | 0.4 | 120 | 118 | 96 | 40.2 | 343 |
| 4n | 0.5 | 70 | 0.2 | 120 | 123 | 161 | 1.05 | 81 |

In Table 3 above, TMA gives the number of ml of a solution of hexane containing 50 g/l of trimethylaluminium, the temperature (Temp.) is given in °C., the partial pressure of hydrogen (H2) in bar, the duration of the polymerization (time) in minutes, the amount of catalyst introduced (Cat.) in mg and the amount of polyethylene collected (PE) in g.

EXAMPLE 5

In Accordance with the Invention a) Preparation of a solid comprising a support and a chromium compound:

20 g of a support of composition $AlPO_4/SiO_2/Al_2O_3$=47.5/50.4/2.1 (molar ratio) and containing 0.7% by weight of Cr were calcined at 815° C. under a stream of dry air. After 16 hours, the solid was recovered.

b) Incorporation of a metallocene (bis(cyclopentadienyl) dichlorozirconium):

13.4 g of the solid obtained in step (a) above were mixed with 0.264 g of bis(cyclopentadienyl) dichlorozirconium at 70° C. for 16 h under nitrogen. The mixture thus obtained is referred to as mixture 5b hereinbelow.

c) Incorporation of an ionizing agent (triphenylcarbenium tetrakis(pentafluorophenyl)borate):

2.7 g of mixture 5b were added to 0.169 g of triphenylcarbenium tetrakis(pentafluorophenyl)borate in 15 ml of toluene. The toluene was then removed by distillation under reduced pressure at room temperature. The catalytic solid was then recovered.

b) Polymerization of ethylene:

1.5 ml of a solution of hexane containing 50 g/l of trimethylaluminium and 1 liter of isobutane were introduced into a 3-liter pre-dried autoclave fitted with a stirrer. The autoclave was heated to 60° C. and this temperature was maintained throughout the test. When the set temperature was reached, ethylene and hydrogen were introduced into the autoclave at partial pressures of 10 and 0.2 bar respectively. 198 mg of the catalytic solid prepared during step (c) described above were then introduced into the autoclave with 100 ml of isobutane at 40 bar. During the reaction, the total pressure was maintained by adding ethylene into the autoclave. After 2 hours, the polymerization was stopped by degassing and cooling the autoclave. 124 g of polymer were collected. The polyethylene is characterized by $MI_2$=2.6 g/10 min and HLMI=240 g/10 min.

EXAMPLE 6

In Accordance with the Invention a) Pre-reduction of the solid comprising a support, a chromium compound and a metallocene:

0.6 g of mixture 5b was placed in a round-bottomed flask conditioned under nitrogen and was then pre-reduced under a flow of ethylene for 15 minutes at room temperature.

b) Incorporation of an ionizing agent (triphenylcarbenium tetrakis(pentafluorophenyl)borate):

The compound obtained during step (a) described above was mixed with 0.0378 g of triphenylcarbenium tetrakis(pentafluorophenyl)borate in 5 ml of toluene. The toluene was then removed by distillation under reduced pressure at room temperature. The catalytic solid was then recovered.

c) Polymerization of ethylene:

0.5 ml of a solution of hexane containing 50 g/l of trimethylaluminium and 1 liter of isobutane was introduced into a 3-liter pre-dried autoclave fitted with a stirrer. The autoclave was heated to 60° C. and this temperature was maintained throughout the test. When the polymerization temperature was reached, ethylene and hydrogen were introduced into the autoclave at partial pressures of 10 and 0.2 bar respectively. 170 mg of the catalytic solid prepared during step (b) described above were then introduced into the autoclave with 100 ml of isobutane at 40 bar. During the reaction, the total pressure was maintained by adding ethylene into the autoclave. After 90 minutes, the polymerization was stopped by degassing and cooling the autoclave. 106 g of polymer were collected. The polyethylene is characterized by $MI_2$=0.1 g/10 min and HLMI=46.8 g/10 min.

EXAMPLE 7

In Accordance with the Invention a) Preparation of a solid comprising a support and a chromium compound:

15 g of a support of composition $AlPO_4/SiO_2/Al_2O_3$ =47.5/50.4/2.1 (molar ratio) and containing 0.7% by weight of Cr were calcined at 815° C. under a stream of dry air. After 16 hours, the solid thus obtained was recovered.

b) Incorporation of a metallocene (dicyclopentadienyldichlorozirconium):

13.77 g of the solid obtained in step (a) above were mixed with 0.2977 g of dicyclopentadienyldichlorozirconium at 70° C. for 16 h 30 under nitrogen. The mixture thus obtained is referred to as mixture 7b hereinbelow.

c) Incorporation of an ionizing agent (triphenylcarbenium tetrakis(pentafluorophenyl)borate):

3.5 g of mixture 7b were added to 0.2288 g of triphenylcarbenium tetrakis(pentafluorophenyl)borate. The mixture was stirred at room temperature for 15 hours. The catalytic solid was then recovered.

d) Polymerization of ethylene:

1.5 ml of a solution of hexane containing 50 g/l of trimethylaluminium and 1 liter of isobutane were introduced into a 3-liter pre-dried autoclave fitted with a stirrer. The autoclave was heated to 60° C. and this temperature was maintained throughout the test. When the set temperature was reached, ethylene and hydrogen were introduced into the autoclave at partial pressures of 10 bar and 0.2 bar respectively. 251.9 mg of the catalytic solid prepared during step (c) described above were then introduced into the autoclave with 100 ml of isobutane at 40 bar. During the reaction, the total pressure was maintained by adding ethylene into the autoclave. After 1 hour, the polymerization was stopped by degassing and cooling the autoclave. 22 g of polyethylene were collected. The characteristics of the resin are:

$MI_2$=0.21 g/10 min.

$MI_5$=2.6 g/10 min.

HLMI=98 g/10 min.

SD=975.3 kg/m$^3$

S=55 g/kg $\mu_2$=6600 dPa$^*$s $\mu_0/\mu_2$=22.4

$M_n$=1100

$M_w$=249000

$M_z$=4760000

EXAMPLE 8

Given by Way of Comparison

In this example, a catalyst as described in patent application EP-A-339,571 was prepared. It was then used for the polymerization of ethylene.

a) Preparation of the catalyst:

To a round-bottomed flask containing 3.3 g of mixture 7b were added 10 ml of dry toluene and 8.8 ml of a solution of toluene containing 315.9 g of methyl aluminoxane per liter. The mixture was stirred for 15 minutes on a rotavapor and the toluene was then stripped off by evaporation under vacuum at 40° C.

b) Polymerization of ethylene:

1 liter of isobutane was introduced into a 3-liter pre-dried autoclave fitted with a stirrer. The autoclave was heated to 60° C. and this temperature was maintained throughout the test. When the set temperature was reached, ethylene and hydrogen were introduced into the autoclave at partial pressures of 10 bar and 0.2 bar respectively. 339.8 mg of the catalyst prepared during step (a) described above were then introduced into the autoclave with 100 ml of isobutane at 40 bar. During the reaction, the total pressure was maintained by adding ethylene into the autoclave. After 1 hour, the polymerization was stopped by degassing and cooling the autoclave. 15 g of polyethylene were collected. The characteristics of the resin are:

$MI_2$<0.1 g/10 min.

$MI_5$<0.1 g/10 min.

HLMI<0.1 g/10 min.

SD=969.0 kg/m$^3$

S=18 g/kg
$M_n$=6630
$M_w$=680000
$M_z$=3850000

On comparison of the results of Example 8 with those of Example 7, it is seen that a catalyst as described in patent application EP-A-339,571 leads, under the same polymerization conditions, to a lower melt index (HLMI<0.1 g/10 min) than the catalytic system according to the invention (HLMI=98 g/10 min).

EXAMPLE 9

In Accordance with the Invention a) Preparation of a solid comprising a support and a chromium compound:

15 g of a catalyst HA30W marketed by Grace-Davison and containing 1% by weight of Cr were calcined at 815° C. under a stream of dry air. After 16 hours, 12.7 g of solid were recovered.

b) Incorporation of a metallocene (bis(cyclopentadienyl) dichlorozirconium):

12.7 g of the solid obtained in step (a) above were mixed with 0.2614 g of bis(cyclopentadienyl) dichlorozirconium at 70° C. for 16 hours under nitrogen. The mixture thus obtained is referred to as mixture 9b hereinbelow.

c) Incorporation of an ionizing agent (triphenylcarbenium tetrakis(pentafluorophenyl)borate):

3.5 g of mixture 9b were added to 0.230 g of triphenylcarbenium tetrakis(pentafluorophenyl)borate. The mixture was stirred at room temperature for 13 hours. The catalytic solid thus obtained was recovered.

d) Polymerization of ethylene:

321 mg of the catalytic solid prepared during step (c) described above and 1 liter of isobutane were introduced into a 3-liter pre-dried autoclave fitted with a stirrer. The autoclave was heated to 60° C. and this temperature was maintained throughout the test. When the set temperature was reached, ethylene and hydrogen were introduced into the autoclave at partial pressures of 10 and 0.2 bar respectively. 0.3 ml of a solution of hexane containing 50 g/l of trimethylaluminium were then introduced into the autoclave with 100 ml of isobutane at 40 bar. During the reaction, the total pressure was maintained by adding ethylene into the autoclave. After 2 hours, the polymerization was stopped by degassing and cooling the autoclave. 374 g of polymer were collected. The polyethylene is characterized by $MI_5$=0.1 g/10 min and HLMI=1.7 g/10 min.

EXAMPLE 10

In Accordance with the Invention a) Preparation of the catalytic solid:

2.1 g of mixture 9b were mixed with 0.137 g of triphenylcarbenium tetrakis(pentafluorophenyl)borate in 10 ml of $CH_2Cl_2$. After stirring for 10 minutes, the $CH_2Cl_2$ was removed by distillation under reduced pressure at room temperature. The catalytic solid was then recovered.

b) Polymerization of ethylene:

343 mg of the catalytic solid prepared during step (a) described above and 1 liter of isobutane were introduced into a 3-liter pre-dried autoclave fitted with a stirrer. The autoclave was heated to 60° C. and this temperature was maintained throughout the test. When the set temperature was reached, ethylene and hydrogen were introduced into the autoclave at partial pressures of 10 and 0.2 bar respectively. 0.3 ml of a solution of hexane containing 50 g/l of trimethylaluminium was then introduced into the autoclave with 100 ml of isobutane at 40 bar. During the reaction, the total pressure was maintained by adding ethylene into the autoclave. After 2 hours, the polymerization was stopped by degassing and cooling the autoclave. 110 g of polymer were collected. The polyethylene is characterized by HLMI=0.6 g/10 min.

EXAMPLE 11

In Accordance with the Invention a) Preparation of the catalytic solid:

1.7 g of mixture 9b were mixed with 0.111 g of triphenylcarbenium tetrakis(pentafluorophenyl)borate in 10 ml of toluene. After stirring for 10 minutes, the toluene was removed by distillation under reduced pressure at room temperature. The catalytic solid was then recovered.

b) Polymerization of ethylene:

376 mg of the catalytic solid prepared during step (a) described above and 1 liter of isobutane were introduced into a 3-liter pre-dried autoclave fitted with a stirrer. The autoclave was heated to 60° C. and this temperature was maintained throughout the test. When the polymerization temperature was reached, ethylene and hydrogen were introduced into the autoclave at partial pressures of 10 and 0.2 bar respectively. 0.3 ml of a solution of hexane containing 50 g/l of trimethylaluminium were then introduced into the autoclave with 100 ml of isobutane at 40 bar. During the reaction, the total pressure was maintained by adding ethylene into the autoclave. After 2 hours, the polymerization was stopped by degassing and cooling the autoclave. 114 g of polymer were collected. The polyethylene is characterized by $MI_2$<0.1 g/10 min and HLMI=18.9 g/10 min.

We claim:

1. A catalytic solid for (co)polymerization of ethylene, comprising:

a) at least one inorganic support;

b) at least one transition metal metallocene having a formula $(C_p)_a(C_p')_b MX_x Z_z$, in which $C_p$ and $C_p'$ each denote a cyclopentadienyl, indenyl, or fluorenyl radical or a substituted derivative of such a radical, coordinated to the central atom M, optionally the groups $C_p$ and $C_p'$ are linked via a covalent bridge, M denotes the at least one transition metal, which is selected from the group consisting of scandium, titanium, zirconium, hafnium and vanadium, a, b, x and z denote integers such that (a+b+x+z)=m, x>0, z≧0 and a and/or b≠0, m denotes the valency of the at least one transition metal M, X denotes a halogen, and Z denotes a hydrocarbon radical which may optionally comprise oxygen or a silyl radical of formula (—$R_t$—Si—R'R"R'") where R denotes an alkyl, alkenyl, aryl, alkoxy or cycloalkyl group comprising up to 20 carbon atoms, R', R", R'" are identical or different and each denote a halogen or an alkyl, alkenyl, aryl, alkoxy or cycloalkyl group comprising up to 20 carbon atoms, and t denotes 0 or 1;

c) at least one ionizing agent selected from the group consisting of triphenylcarbenium tetrakis(pentafluorophenyl)borate, N,N-dimethylanilinium tetrakis(pentafluorophenyl)borate, tri(n-buryl) ammonium tetrakis(pentafluorophenyl)borate, lithium tetrakis(pentafluorophenyl)borate, tris(pentafluorophenyl)boron, triphenylboron, trimethylboron, tris(trimethylsilyl)borate and organoboroxines, and d) at least one chromium compound which is selected from the group consisting of chromium oxides, chromium acetate, chromium chloride, chromium sulfate, chromates, dichromates and chromium acetylacetonate, and which is present in a molar ratio of chromium/transition metal M ranging from 0.001 to 100.

2. The catalytic solid according to claim 1, wherein the at least one inorganic support is selected from the group consisting of silica, alumina, magnesium dichloride, aluminum phosphate and mixtures of silica, alumina and aluminum phosphate.

3. A process for the preparation of a catalytic solid in accordance with claim 1, comprising:

a. preparing a solid comprised of at least one inorganic support and at least one chromium compound; and b. incorporating into the solid a compound based on at least one transition metal metallocene and a compound based on at least one ionizing agent.

4. The process according to claim 3, wherein step (a) is performed by means of mechanical mixing of the at least one inorganic support with the at least one chromium compound in the absence of a liquid to form a mixture, followed by a pre-activation of the mixture by heating the mixture to a temperature below the melting point of the at least one chromium compound to form a preactivated mixture and an activation by heating the pre-activated mixture to a temperature ranging from 400 to 1000° C. in order to convert at least some of the chromium into hexavalent chromium.

5. The process according to claim 3, wherein the compound based on at least one transition metal metallocene and the compound based on the at least one ionizing agent are successively incorporated in step (b) by first mixing the solid comprising at least one inorganic support and at least one chromium compound with the compound based on at least one transition metal metallocene in the absence of a liquid to provide a mixture, followed by impregnating the mixture thus obtained with a solution of a compound based on an ionizing agent.

6. A catalytic system for (co)polymerization of ethylene obtained by placing:

a) a catalytic solid in accordance with claim 1 in contact with b) at least one cocatalyst selected from the group consisting of organometallic compounds of a metal chosen from groups IA, IIA, IIB, IIIA and IVa of the Periodic Table.

* * * * *